Patented June 20, 1933

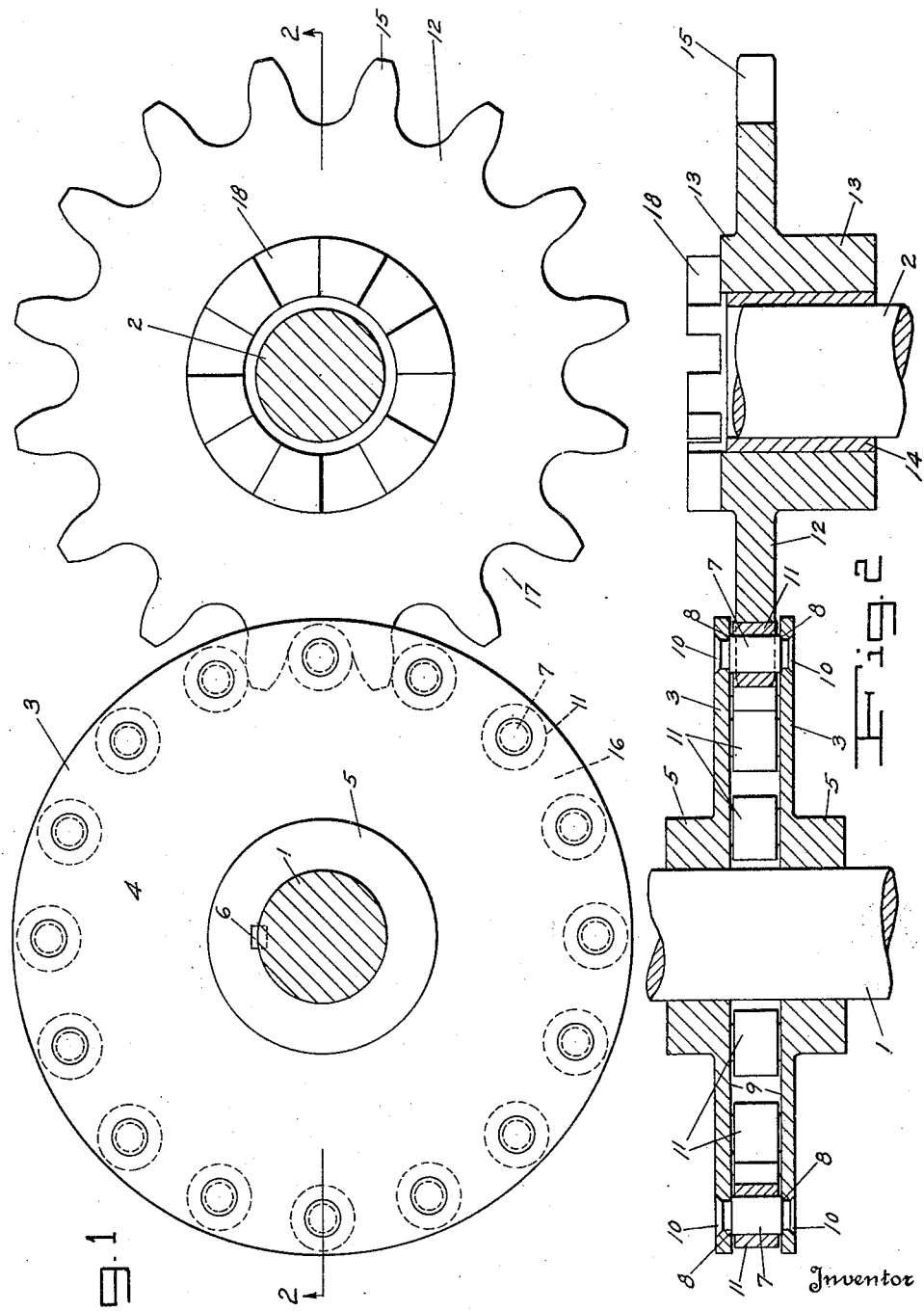

1,914,797

UNITED STATES PATENT OFFICE

CLARENCE P. BAKER, OF PORTLAND, OREGON

ROLLER GEARING

Application filed December 14, 1931. Serial No. 580,758.

This invention relates to an improvement in gears or gearing used for power transmission. The invention contemplates an improvement in gears whereby friction common between meshing gears is substantially eliminated, thereby reducing wear to a minimum, substantially eliminating noise incident to mechanisms of this class, thus rendering the invention especially suitable for use in transmission systems, particularly automotive transmissions.

The invention consists of a pair of meshing gear members. One of these is provided with teeth cut in its perimeter which engage or mesh with spaced rolls mounted proximate the perimeter of the other member. These rolls are mounted for rotation about their axes and revolve when engaged by the teeth of the toothed member so that there is a minimum of friction and noise occasioned by the meshing of the two members. From the foregoing it will be seen that several objects are attained by this invention, as, for instance—

One object of the invention is to provide a gearing wherein friction is substantially eliminated, thereby reducing wear and noise of operation to a minimum.

Another object of the invention is the provision of a gearing for use in automotive transmission systems requiring a minimum of lubricant for its successful operation.

Another object of the invention is the provision of a substantially silent gearing.

Other objects achieved by this invention will become readily apparent upon reading the specification which follows, aided by the drawing, wherein—

Figure 1 is an elevation of the invention, and shows the toothed gear and roller gear in meshing engagement with each other.

Figure 2 is the section view indicated by the section line 2—2 of Figure 1.

Similar numerals refer to similar parts throughout the description and drawing.

In the drawing, shafts 1 and 2 are respectively drive and driven shafts. Upon shaft 1 are mounted a pair of like gear disks 3 which constitute the gear member 4. Disks 3, held in spaced relationship with each other as hereafter explained, are provided, to project from one face only, with hubs 5 having spline seats for the seating of the key 6 securing them for rotation with shaft 1, the shaft having the necessary complementary seat for such key.

Extending between the two disks 3 are a number of pins 7 which are arranged axially parallel to shaft 1. These pins are located proximate the perimeter of the disks, are equally spaced from one another and extend into apertures provided therefor in the respective disks 3. The end portions of pins 7 are reduced in cross section to provide shoulders 8 which bear upon the inner faces 9 of disks 3. The ends 10 of the pins are riveted or peened in enlarged portions of the apertures provided therefor in the disks, thereby solidly fastening the pins to the disks as well as securing the disks in their spaced relationship with regard to one another. Each pin 7 carries for rotation a roller 11, which rollers are so designed that each freely rotates upon its supporting pin. The length of the rollers are such that their ends will not bind upon the inner faces 9 of the disks.

Upon shaft 2 is mounted a toothed gear member 12. Member 12 has a hub 13 by which it is mounted to said shaft. Hub 13 is provided with an inner bushing 14 designed for free rotation on shaft 2, thereby permitting member 12 to rotate freely on said shaft. Member 12 is provided with a number of peripherally cut teeth 15 which mesh with rollers 11. Teeth 15 enter into the spaces 16 between the rollers 11, and rollers 11 enter into spaces 17 between teeth 15. The rollers bearing upon the teeth as the member 4 is rotated, rotate the gear 12. As it is contemplated that gear 12 will transmit power to other members not shown, hub 15 is provided with clutch dogs 18 which are engaged by complementary dogs on a clutch member not shown.

Lubrication can be supplied to the gear members in any approved manner. In the larger type of gears for industrial use, grease cups can be provided for supplying lubricants to the rolls 11. For gears of this type installed in automotive transmission systems, an oil bath in the transmission casing will supply the necessary lubricant.

While the invention is especially suitable for automotive transmission installations, it will be apparent that its use is not restricted to such, as its application to other types of power transmission is practically unlimited.

Having described my invention, what I claim as being new and desire to secure by Letters Patent, is A roller gearing comprising a pair of alike and interchangeable disks, said disks each being provided with a central hub projecting from one face, said hubs being provided with means for mounting the said disks upon a shaft spaced apart with the aforesaid hubs directed outwardly, a plurality of pins extending between the aforesaid disks, said pins having shoulders bearing upon the inner faces of the disks and having their ends peened in the outer faces of the disks thereby securing each disk in immovable relationship with regard to the other, said pins being positioned proximate the periphery of said disks and having an equal spacing between adjacent pins, and a roll mounted upon each pin substantially as and for the purposes described.

CLARENCE P. BAKER.